(12) United States Patent
Phippen

(10) Patent No.: US 7,128,352 B1
(45) Date of Patent: Oct. 31, 2006

(54) ANIMAL URINE SPECIMEN COLLECTION DEVICE

(76) Inventor: Geraldine Phippen, 3671 Firethorn St., Rockford, IL (US) 61114

( * ) Notice: Subject to any disclaimer, the term of this patent is extended or adjusted under 35 U.S.C. 154(b) by 0 days.

(21) Appl. No.: 10/662,250

(22) Filed: Sep. 15, 2003

(51) Int. Cl.
*A01K 29/00* (2006.01)
(52) U.S. Cl. ........................................ 294/1.5; 119/161
(58) Field of Classification Search .......... 294/1.3–1.5, 294/55, 19.1, 19.2, 27.1, 33; 119/161
See application file for complete search history.

(56) References Cited

U.S. PATENT DOCUMENTS

| | | | |
|---|---|---|---|
| 2,372,930 A * | 4/1945 | Bovee | 81/64 |
| 3,052,214 A | 9/1962 | Johnson | |
| 3,090,356 A | 5/1963 | Andrisani | |
| 3,281,178 A | 10/1966 | Fisher | |
| 3,446,525 A | 5/1969 | Jones | |
| 3,786,780 A | 1/1974 | Pezzino | |
| 4,007,285 A * | 2/1977 | Maier et al. | 426/108 |
| 4,010,970 A * | 3/1977 | Campbell | 294/1.5 |
| 4,014,584 A * | 3/1977 | Bau | 294/1.4 |
| 4,193,624 A * | 3/1980 | Kerr | 294/1.5 |
| 5,174,965 A * | 12/1992 | Jones et al. | 422/102 |
| 5,415,447 A * | 5/1995 | Moore et al. | 294/33 |
| 5,492,220 A * | 2/1996 | Estay | 206/363 |
| 5,787,843 A | 8/1998 | Chao | |
| 6,039,370 A * | 3/2000 | Dooley et al. | 294/1.5 |
| 6,158,395 A | 12/2000 | Bauklon | |
| 2004/0124646 A1* | 7/2004 | Peko | 294/1.4 |

* cited by examiner

*Primary Examiner*—Dean J. Kramer

(57) ABSTRACT

A device, method and kit for collection of a urine specimen from an animal includes a cup to receive and hold the urine specimen, a lid to close cup after collection of the specimen, and a holder with a generally upright center extension member, a handle connected at the upper end of the extension member, and a cup holder extending forwardly from the lower end of the extension member and having an opening slidably receiving the cup for manual positioning of the cup under the animal from which the urine specimen is to be collected.

19 Claims, 7 Drawing Sheets

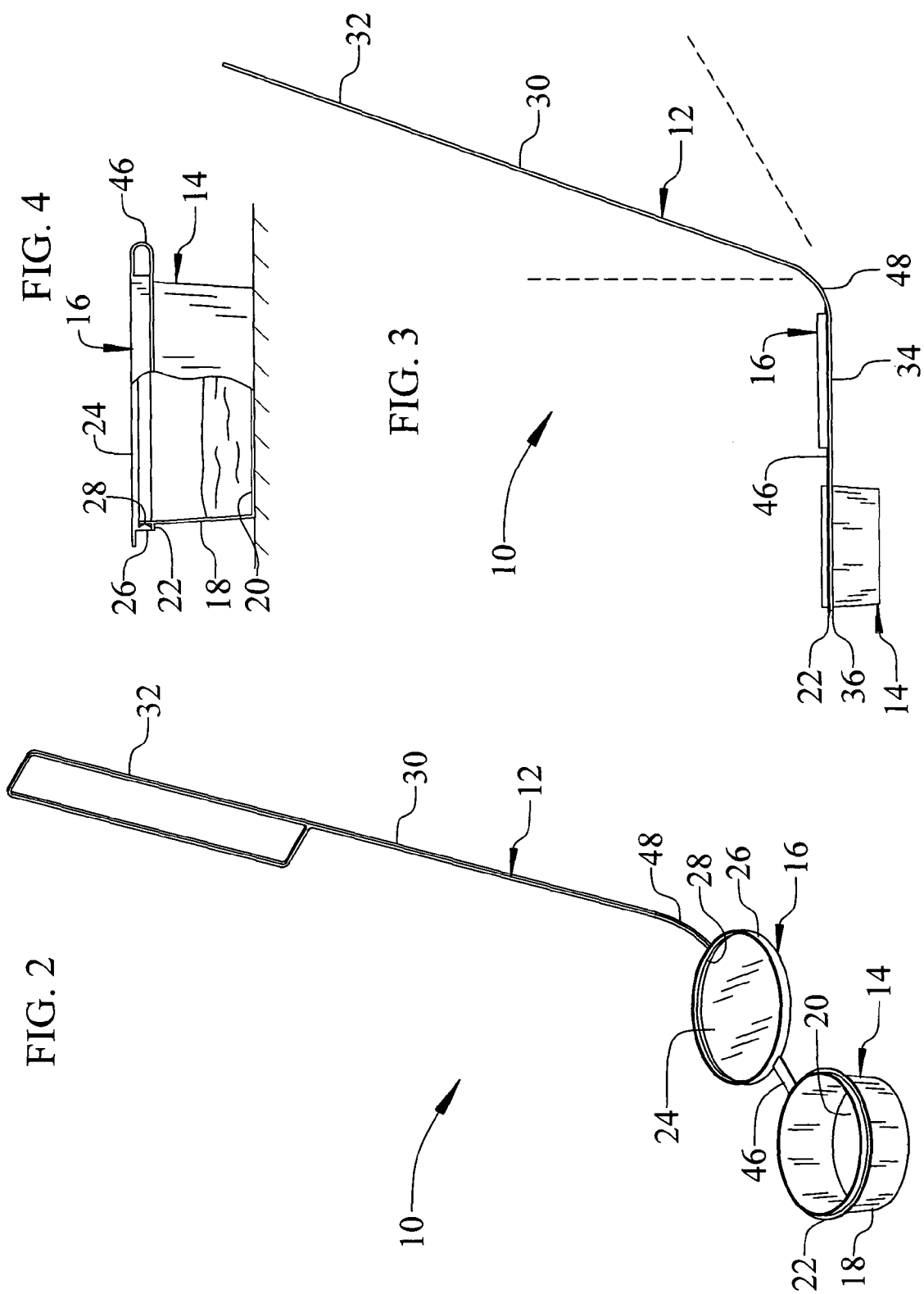

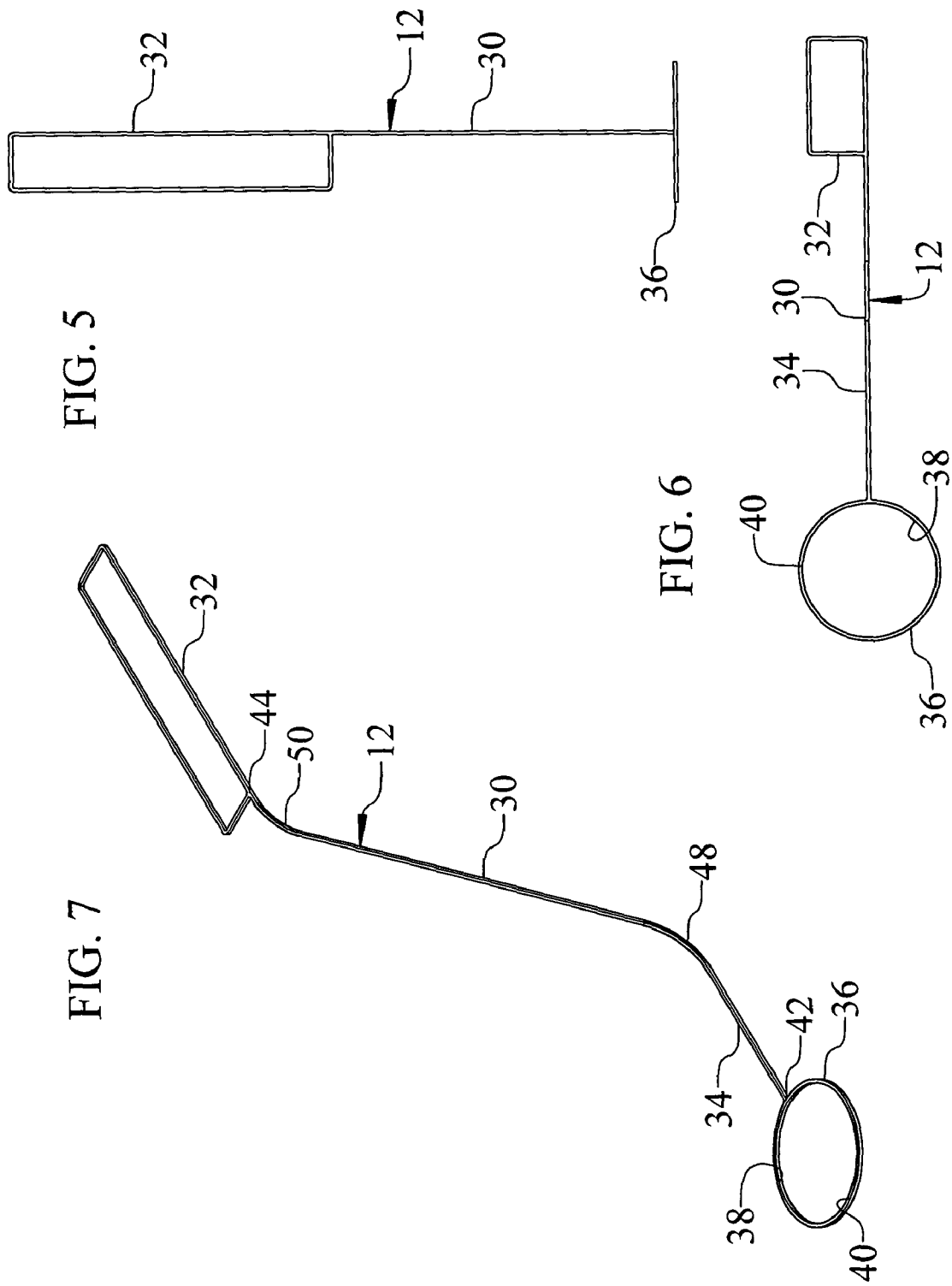

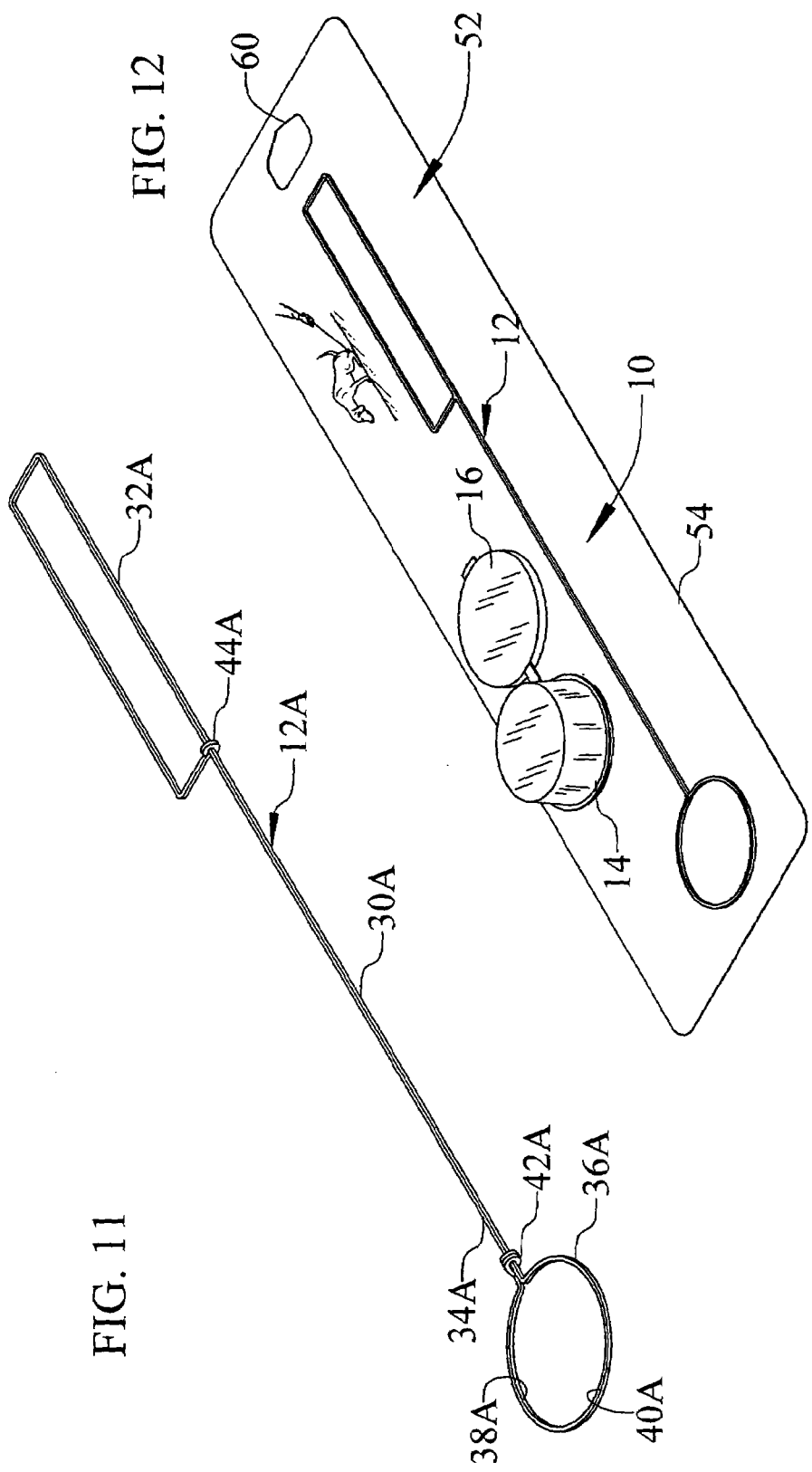
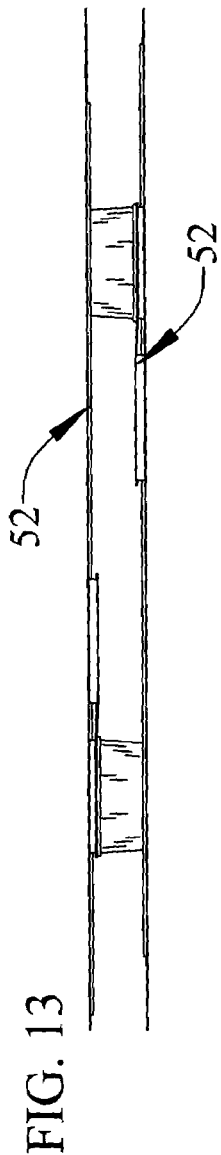
FIG. 11
FIG. 12
FIG. 13

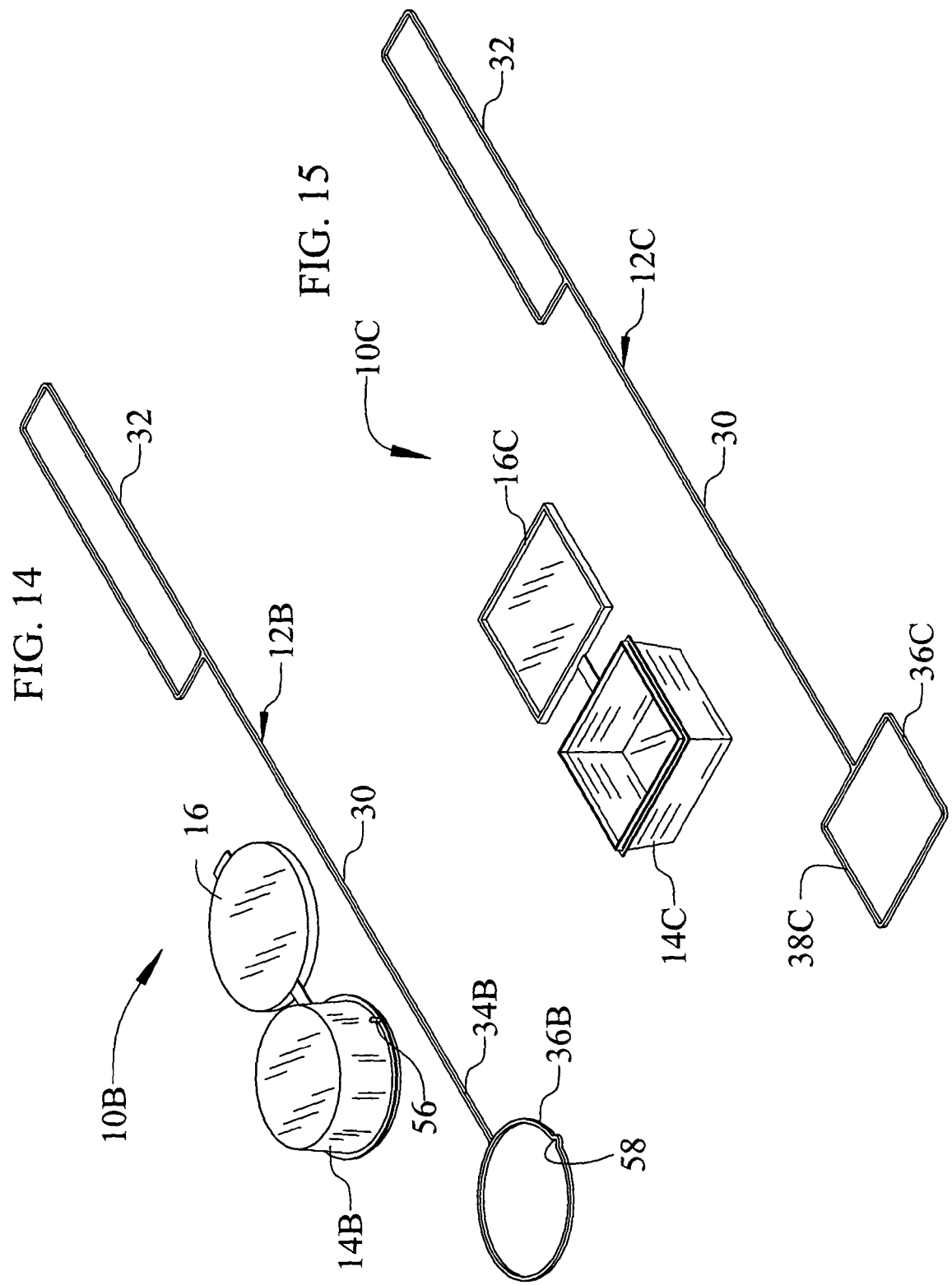

ANIMAL URINE SPECIMEN COLLECTION DEVICE

CROSS-REFERENCES TO RELATED APPLICATIONS

None.

REFERENCE TO SEQUENCE LISTING, TABLE, OR COMPUTER PROGRAM LISTING APPENDIX SUBMITTED ON A COMPACT DISC

N/A.

STATEMENT REGARDING FEDERALLY SPONSORED RESEARCH OR DEVELOPMENT

N/A.

BACKGROUND OF THE INVENTION

1. Field of Invention

The present invention relates to a device for collection of animal waste.

More particularly, the invention relates to a device for collection of a urine specimen from an animal, such as to be delivered to a laboratory for testing and analysis, and which, while suitable for other uses, is especially suitable for personal or home use in connection with collection of a specimen from a family dog or cat. The invention also relates to a method for collecting an animal urine specimen, and to an animal urine specimen collection kit.

2. Description of Related Art

The owner of a dog or cat may, upon occasion, need to collect a urine specimen from the animal for delivery to a veterinarian and subsequent testing and analysis purposes.

Many prior animal waste collection devices, particularly those intended for personal use, focus on the collection and disposal of solid waste. Solid waste collection devices are shown in Johnson, U.S. Pat. No. 3,052,214; Fisher, U.S. Pat. No. 3,281,178; Jones, U.S. Pat. No. 3,446,525; Pezzino, U.S. Pat. No. 3,786,780 and Bauklon, U.S. Pat. No. 6,158,395. Bauklon discloses a portable waste collection device with a bowl-shaped container to hold a plastic bag, and apparatus to close the bag after collection of the waste. The Pezzino device includes a rod provided with a handle at the upper end and a bag holder at the lower end. The bag holder has a substantially open front end for installation and removal of a waste collection bag. The bag is held in position on the holder with a string that encircles the top of the bag and slips over a hook on the rod, and with prongs that slip into slits along the sides of the bag. The Fisher device also includes an elongated body with a handle at one end and a bag holder at the other end. In this instance, the bag holder is a forwardly opening frame structure over which the folded-over collar of a bag is slipped to hold the bag with its open end facing forwardly to scoop solid waste from the ground. Johnson provides yet another device with a closable bag and mechanism for collection and disposal of solid waste. The Jones device has movable forks to grab and pickup dog waste from the ground. None of these prior devices lend themselves for convenient collection of a urine specimen. Rather, they are intended and specifically adapted for use in collecting and disposing of solid waste.

Prior devices intended for collection of urine specimens from a dog or cat are often configured to be secured around the hind quarters of the animal. Such devices are shown in Chao, U.S. Pat. No. 5,787,843; and Andrisani, U.S. Pat. No. 3,090,356. These types of devices are relatively complicated and inconvenient to use. The owner must secure the device onto the animal with multiple straps, well before the animal may be ready to urinate. The animal must then wear the device until the specimen is collected and the owner removes the device.

Collection of a urine specimen from a household pet should not be such a complicated and inconvenient task. A trained pet will signal its owner when it is ready to go outside. It would be convenient if the owner could simply let the animal out, as usual, and then accompany the animal with an easy to use device that enables collection of a urine specimen without interrupting the animal's routine. In addition, the need for a urine specimen collection device by the typical pet owner is an infrequent occurrence. Accordingly, there is a need for a less expensive urine specimen collection device that is less intrusive and more convenient to use than the prior devices intended for the same general purpose.

BRIEF SUMMARY OF THE INVENTION

The general aim of the present invention is to provide a new and improved device for the collection of animal urine specimens, the device being more convenient and less intrusive to use than prior urine specimen collection devices.

An important objective of the invention is to provide an improved device that is particularly suitable for collection of specimens from domestic household animals such pet dogs and cats.

Another important objective of the invention is to provide a specimen collection device that is relatively simple in construction, and that can be manufactured and distributed at a relatively low cost. This enables the device to be distributed for limited uses at a reasonable cost to the consumer.

Yet another important objective of the invention is to provide a specimen collection device that is configured for self-explanatory ease of use by the infrequent or casual user.

Still another important objective of the invention is to provide a specimen collection device in the form of a low cost, disposable kit.

Still another important objective of the invention is to provide an improved method for the collection of a urine specimen from an animal.

These and other objectives and advantages of the invention will become more apparent from the following detailed description when taken in conjunction with the accompanying drawings.

A basic embodiment specimen collection device in accordance with the invention includes a plastic cup to receive and hold the specimen, a plastic lid to close the cup after collection of the specimen, and a holder having an operative position with (i) a generally upright extension member, (ii) a cup holder extending forwardly from the lower end of the extension member, the cup holder having an opening to slidably receive and carry the cup in an upright position, and (iii) a handle extending from the upper end of the extension member to enable manual positioning of the specimen cup under the animal from which the specimen is to be collected. The closable specimen cup enables safe and convenient storage and transportation of the specimen to the veterinarian or laboratory. The holder is sized for ease and convenience of positioning the specimen cup under the animal during its normal routine to collect a urine specimen. The preferred holder is of unitary construction, with no moving parts, no parts to assemble by the user, and no ties or other arrangements to wrap around the animal. Both the holder and the specimen cup are of simple and inexpensive construction. Accordingly, the collection device can be purchased, used, and then, if desired, discarded, without incurring significant cost.

In accordance with one aspect of the invention, the specimen collection device includes a guide structure to hold the cup in a substantially fixed position in the cup holder, and prevent the cup from slipping out of the opening in the cup holder as the cup is manipulated and maneuvered in the holder into and out of position under the animal. This permits safe, and convenient use of the collection device.

In accordance with another aspect of the invention, the holder is formed with semi-rigid yet manually bendable material connecting at least the extension member and the cup holder. This material is sufficiently rigid to support the weight of the relevant holder parts and the weight of a filled specimen cup without undue distortion (i.e., inconvenience to the user), yet is sufficiently bendable for manual bending, shaping and reshaping by the user, to enable manual repositioning of the extension member and the cup holder in relation to one another to the user's preference and convenience.

In accordance yet another aspect of the invention, the specimen cup is provided with a flange structure, the cup holder extends forwardly from the lower end of the extension member establishing an angle of between approximately 90 to 150 degrees, and the cup holder is provided with a flange structure that is complimentary to the cup, to establish an opening that slidably but snugly receives the cup, and supports the cup flange to maintain the cup in an upright position when the cup is positioned in the holder.

In additional collection device embodiments:—a flexible, plastic strap integrally connects the lid and cup together to insure convenient location of the lid after collection of the specimen;—the entire extension member is formed with semi-rigid yet manually bendable material to enable manual reshaping of the substantially the entire holder to the user's convenience;—the holder is formed with unitary wire or molded plastic construction for a lightweight, cost effective device; and—the handle extends rearwardly from the upper end of the extension member with an inside angle less than 180 degrees for further user convenience. These and other aspects of the invention are shown in the drawings and described further below.

In accordance with another aspect of the invention, a method for collecting a urine specimen from an animal briefly includes providing a plastic cup, a plastic lid, and a holder removably carrying the cup; with the holder, manually positioning the cup under the animal while it urinates; withdrawing the cup and cup holder from under the animal; and closing the cup to contain the urine specimen therein.

In accordance with still another aspect of the invention, a kit for collecting a urine specimen from an animal includes a holder as generally described above and one or more specimen collection cups and lids prepackaging such as onto a merchandising card or in another merchandising package. The preferred holder is initially flat for convenience of packaging in the kit, and is then reshaped by the user for his or her convenience to enable positioning of a specimen cup under the animal from which the urine specimen is to be collected. If reuse is anticipated, the holder may then be reshaped flat for storage convenience.

BRIEF DESCRIPTION OF THE SEVERAL VIEWS OF THE DRAWINGS

FIG. 2 is a perspective view of a urine specimen collection device in accordance with the invention, the device being shown in an operative position for collection of a urine specimen from under the animal, the device comprising a holder, a specimen collection cup slidably carried in the holder, and a lid to close the cup.

FIG. 3 is a side elevation view of the specimen collection device shown in FIG. 2.

FIG. 4 is a side elevation view of a closed specimen cup after collection of a urine specimen, with a portion of the cup being broken away to expose internal details of the filled and closed cup.

FIG. 5 is a front elevation view of the holder shown in FIG. 2, the holder comprising a handle, a center extension, and a cup holder.

FIG. 6 is a top plan view of the holder shown in FIG. 2.

FIG. 7 is a perspective view of the holder shown in FIG. 2, but with an alternate angular relationship between the extension member and the handle.

FIG. 11 is a perspective view of an alternate embodiment holder shown in a flat condition.

FIG. 12 is a perspective view of a packaged urine specimen collection kit in accordance with the invention.

FIG. 13 is a side elevation view of two packaged kits arranged for efficient shipping and storage.

FIG. 14 is a perspective view of a second alternate embodiment specimen collection device in accordance with the invention, including a cup indexing arrangement in the form of a complimentary pin and slot provided in the cup and holder, respectively.

FIG. 15 is a perspective view of a third alternate embodiment specimen collection device in accordance with the invention, including a rectangular specimen cup.

Figure 1:
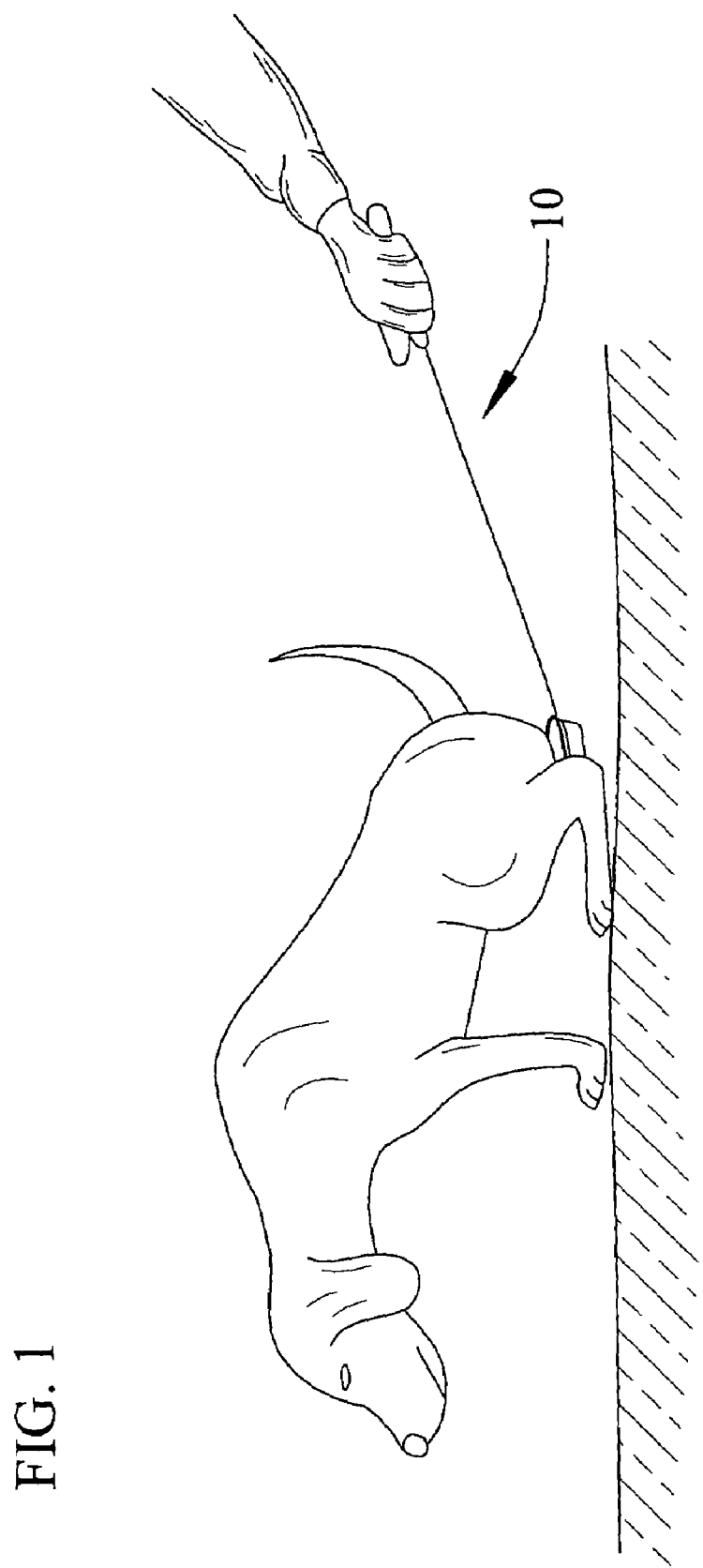
FIG. 1 is a perspective view showing use of a urine specimen collection device according to the present invention while collecting a urine specimen a female dog.

Reference numerals shown in the drawings correspond to the following items:

| | |
|---|---|
| 10 | specimen collection device |
| 12 | holder |
| 14 | specimen cup |
| 16 | cup lid |
| 18 | cup sides |
| 20 | cup bottom |
| 22 | cup flange |
| 24 | lid top |
| 26 | lid sides |
| 28 | lid internal profile |
| 30 | extension member |

-continued

| 32 | handle |
| 34 | cup holder |
| 36 | cup holder flange |
| 38 | cup-receiving opening |
| 40 | flange upper surface |
| 42 | connection location |
| 44 | connection location |
| 46 | strap |
| 48 | connection location |
| 50 | connection location |
| 52 | collection device kit |
| 54 | package card |
| 56 | pin |
| 58 | slot |
| 60 | hanger hole |
| ##A–D | designate above items for alternate embodiments |
| 62 | open ends |
| 64 | opening in card for cup |

While the invention is susceptible of various modifications and alternative constructions, certain illustrated embodiments have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE INVENTION

The present invention relates to urine specimen collection device for use with animals, a specimen collection kit, and a method for collecting a urine specimen from an animal. For purposes of illustration, there is shown in FIG. 1 a female dog in her normal squatting position, and use of a device 10 in accordance with the invention for collection of a specimen from the dog.

Referring to FIGS. 2 and 3, the specimen collection device 10 includes a cup 14 to receive and hold a specimen, a holder 12 configured to removably carry the specimen cup and enable manual positioning of the cup in an upright position under the animal from which a specimen is to be collected, and a lid 16 to close the cup after the specimen has been collected.

The specimen cup 14 is a molded plastic cup with an open top, a closed bottom 20, and surrounding sides 18 to receive a urine specimen from above the cup through the open top, and to hold the specimen for storage and transportation purposes. The cup further includes a downwardly facing surface to be supported on the holder 12. The downwardly facing surface shown is established on the underside of a flange structure 22 that extends outwardly from the upper portion of the cup. The lid 16 is a molded plastic lid with a closed top 24, an open bottom and surrounding sides 26 to be removably secured (e.g., slipped over or into or threaded onto or otherwise securely covering the top of the cup) to the cup and snugly close the open top of the cup after collection of the specimen. The lid shown is formed with an internal profile 28 that snaps or slides snugly onto the upper perimeter of the cup to snugly close the cup. The cup and lid shown are connected with an integrally molded flexible plastic strap 46. The strap insures the lid will always be readily available to close the cup immediately after the specimen is collected.

The holder 12 includes a generally upright center extension member 30 with upper and lower ends (when the holder is in an operative position such as shown in FIGS. 2 and 3), a handle 32 connected to the upper end of the extension member, and a cup holder 34 connected to and extending forwardly from the lower end of the extension member. As shown in FIGS. 6 and 7, the cup holder 12 is formed with an upwardly opening recess that establishes a downwardly extending opening 38 sized to slidably receive the specimen cup 14 from above the opening. The cup holder further includes guide structure to hold the cup in a substantially fixed position in the cup holder. The guide structure is established with rearwardly facing, opposite facing sides, and forwardly facing wall structure located on the cup holder in general horizontal alignment with the cup, to limit the side-to-side and front-to-back movement of the cup in the cup holder 34 and thereby prevent the cup from slipping out the front, sides and back of the opening 38. An upwardly facing surface structure 40 is configured to engage the flange 22 of the cup 14, and support the cup in an upright position, with the cup positioned in the opening 38. The preferred cup holder includes a flange structure 36 that extends sufficiently around the cup to establish the forwardly facing, rearwardly facing, and oppositely facing sides guide structure, and to simultaneously establish the opening 38 and the upwardly facing surface 40 to engage the flange 22 and support the cup in the opening 38.

The cup holder 34 shown is formed with a closed ring structure that establishes the size of the opening 38 for a sliding but relatively close clearance to snug fit with the sides of the specimen cup, such that the sides defining the opening establish the above-described guide structure to limit movement of the cup in the cup holder. The closed ring structure further establishes a flange 36 encircling the cup position and configured with the upwardly facing surface 40 to engage the underside of the flange 22 of the cup 14. This overall preferred fit and support cooperation between the cup and cup holder maintain the cup in position in the holder as the cup may be tipped and slipped into and out of position under the animal from which the specimen is to be collected, and as the holder may be otherwise maneuvered prior to and after collection of the specimen.

As shown best in the side view of FIG. 3, the extension member 30 extends generally upright to rearwardly upon progressing from its lower end to its upper end. The inside angle between the cup holder 34 and the extension member is established at between approximately 90 degrees to 150 degrees as indicated by dashed lines in FIG. 3. The angle between the cup holder and extension member shown is set at approximately 110 degrees. The handle 32 extends generally upright to rearwardly from the upper end of the extension member. The handle may extend inline with the longitudinal axis of the extension member as shown in FIGS. 2 and 3, or the handle may extend at an alternate angle rearwardly from the upper end of the extension member such as shown in FIG. 7, i.e., at an inside angle of less than 180 degrees. The handle is sized for convenient manual gripping in one hand, to enable maneuvering and positioning the holder 12 and specimen cup 14 therein with one hand. The lengths of and angles between the extension member, the cup holder, and the handle are established for convenience in positioning the specimen cup under an animal, with the top of the cup in a generally horizontal position (i.e., opening upwardly) under the animal to receive the specimen. For example, with the handle and extension member positioned at approximately 90 degrees from the cup holder, the user may stand close to the animal while collecting a specimen. Alternately, positioning the extension member up to approximately 150 degrees enables the user to back away from the animal, and permits use of the device by smaller persons. In one preferred embodiment, the holder is sized with an overall length of approximately 20 inches.

Collection of a urine specimen from a trained pet with the collection device 10 involves simply waiting until the pet signals it is ready to go outside, accompanying the animal outside, and then positioning the open specimen cup 14 carried in the cup holder 34 under the animal as it urinates. After collection of the specimen, the lid 16 is snapped over the top of the cup, either while the cup is in the holder or after the cup is removed from the holder.

Thus, a method for collecting a specimen in accordance with the invention includes: (A) providing (i) a plastic specimen cup with an open top to receive and hold the urine specimen, (ii) a plastic lid removably securable to the cup to close the top of the cup after collection of the specimen, and (iii) a holder having an operative position with (a) a center extension member with upper and lower ends, (b) a cup holder extending forwardly from the lower end of the extension member and removably carrying the cup, and (c) a handle extending from the upper end of the extension member; (B) with the holder, manually positioning the cup in an upright position opening upwardly under the animal; (C) collecting the urine specimen in the cup located under the animal while it urinates; (D) withdrawing the cup holder and cup from under the animal; and (E) closing the cup with the lid to contain the urine specimen therein.

The preferred holder 12 is provided with lightweight, inexpensive construction. Lightweight construction promotes ease of use. Inexpensive construction results in low cost to the consumer, and enables promotion of the device as a low-cost and/or disposable unit. The preferred holder is further of unitary construction, with the extension member 30, the handle 32 and the cup holder 34 being permanently connected or integrally formed with one another. Unitary construction assists in providing a low cost unit through low manufacturing costs, including but not limited to the absence of manufacturing and related costs for connectors or connectable components. Further, there are no pieces to be lost with a unitary construction unit, contributing to enhanced ease of use as compared with prior specimen collection devices that must be assembled prior to use.

The cup holder 34 shown is formed with a closed ring structure that establishes the size of the opening 38 and completely encircles the cup position for a snug fit with the cup 14, and that establishes an encircling flange structure 36 to provide a stable base upon which the cup flange 22 rests with the cup positioned in the holder. The cup, the flange 36 and the opening 38 shown are formed with circular cross-sections when viewed from above as in FIG. 6. Although an alternate configuration handle may be provided, the preferred handle is in the form of a closed loop. The closed loop handle is provided with a convenient gripping handle size, in a lightweight configuration.

The preferred holder 12 is further formed of semi-rigid yet manually bendable material connecting at least the extension member 30 and the cup holder 34 together as indicated at 48, and preferably further connecting the extension member and the handle 32 together as indicated at 50. These connections are sufficiently rigid to at least substantially maintain their shape while supporting the weight of a filled specimen cup without undue bending or distortion that would result in inconvenience to the user while collecting and handling the specimen. The bendable connection 48 between the extension member and the cup holder enable the user to manually position the angle of the cup holder in relation to the extension member and the handle to his or her preference and convenience. The bendable connection 50 between the extension member and the handle enable manual positioning of the handle in relation to the extension member and the cup holder for further user convenience. Thus, to enable manual bending, and avoid a natural tendency for inadvertent bending to one side or the other, the bendable connections are preferably with a material bending stiffness characteristic that is no greater in the vertical plane passing through the longitudinal axis of the extension member as in the horizontal plane passing through each connection, such as established by the cross-section dimensions of the material or otherwise in such horizontal and vertical planes. In other words, assuming constant material thickness and homogeneous material characteristics, the material thickness at such connections is not greater as viewed from the side (as in FIG. 3) than the material thickness as viewed from the front or top (as in FIG. 5 or 6).

In preferred embodiments, both bendable connections 48 and 50 are accomplished by constructing at least the entire extension member 30 from the above-described semi-rigid yet manually bendable material. This results in establishing connections of the bendable material at the upper and lower ends of the extension member, with the cup holder 34 and the handle 32 connected to the ends of the extension member in a permanent or integral manner. To achieve the preferred unitary construction, without the need to weld or otherwise permanently connect the parts of the holder 12 together, further preferred embodiment holders are constructed entirely from the above-described semi-rigid yet manually bendable material. This enables bending, shaping and reshaping of the entire unit, including both the lengths of the extension member, the cup holder and the handle, as well as the angles therebetween, to the user's preference. Thus, the methods of the invention include bending or shaping at least one of the connection between the extension member and the cup holder and the connection between the extension member and the handle, and optionally adjusting the length of the extension member by reshaping for the user's angle and height preferences prior to positioning the specimen cup under an animal.

One preferred material that meets the constructional aspect of the invention noted above is wire stock, such as similar in diameter and rigidity to semi-rigid coat hanger wire (e.g., approximately 14 gauge, 0.08 inch diameter, steel wire), whose ends may be welded as indicated at locations 42 and 44 to the adjoining structure, and which may be partially or completely plastic coated for handling safety and convenience. As shown in FIG. 11 alternate holder 12A may be optionally formed with the free ends 42A, 44A of the wire coiled around the adjacent wire structure. An alternate preferred semi-ridge yet manually bendable material is larger diameter (e.g., 11 or 10 gauge) plastic coated electrical-type wire. In such embodiments, forming the handle in a closed loop, as shown, provides further advantages of establishing a relatively stiff, yet lightweight handle for further ease of reshaping and reconfiguring the size of the handle to the user's preference. In yet another preferred embodiment, the holder is a unitary molded plastic part with an embedded wire or functionally equivalent structure to permit reshaping characteristics and maximize user convenience as discussed above. Alternately, the plastic holder may be molded into a preformed shape with pre-established lengths and angles to achieve further reduced costs to the consumer.

Figure 8:
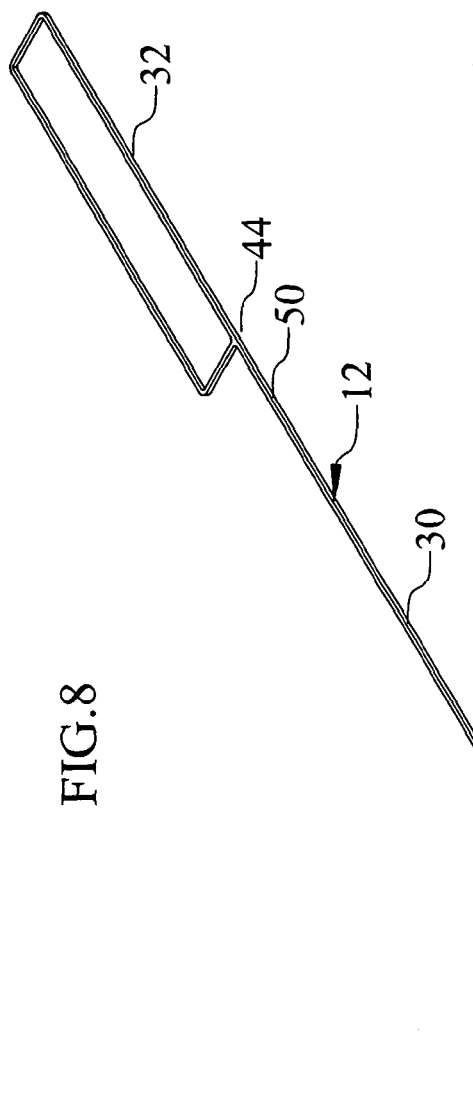
FIG. 8 is a perspective view of the holder in a flat condition.
Figure 9:
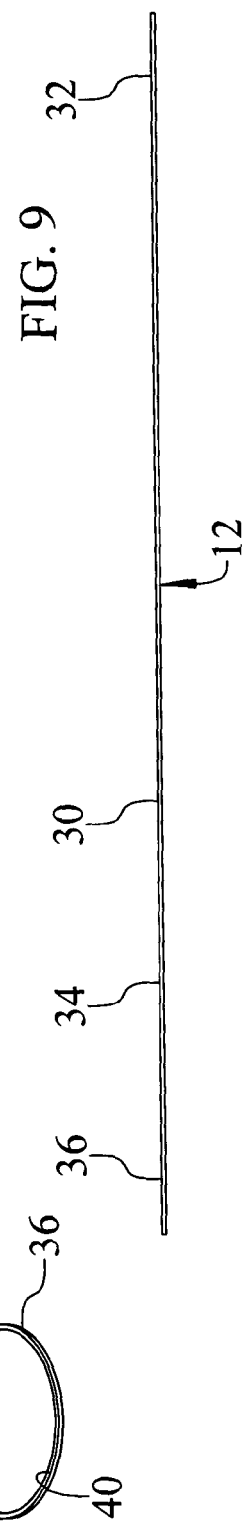
FIG. 9 is a side elevation view of the flat holder shown in FIG. 8.
Figure 10:
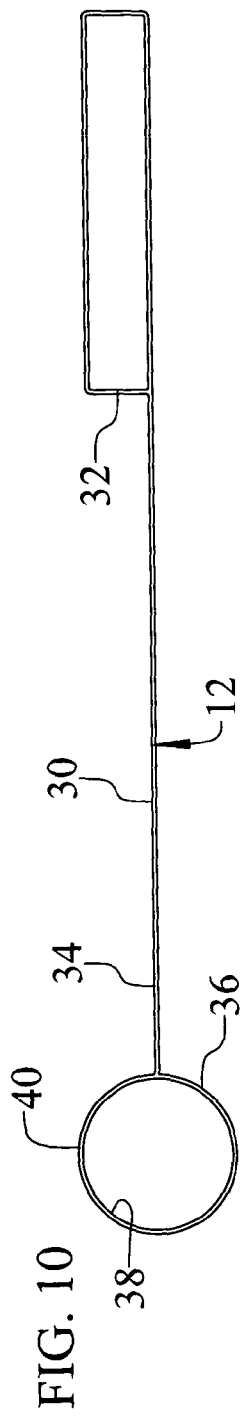
FIG. 10 is a top plan view of the flat holder shown in FIG. 8.

Constructing at least the connection 48 between the extension member 30 and the cup holder 34, and optionally the connection 50 between the extension member and the handle 32, or the entire extension member or holder 12 from semi-rigid yet manually bendable material also permits the holder to be initially formed, packaged and shipped in a flat condition such as shown in FIGS. 8–10, or folded over at one of the bendable material locations into a flat condition. This further promotes low overall cost to the consumer with low packaging and shipping costs, and low storage costs and space requirements. Referring to FIGS. 12 and 13, this initial flat holder condition is conveniently packaged with a cup 14 and lid 16 in a specimen collection kit 52, such as in a plastic bag, or with the holder, cup and lid fixed to a backing card 54 provided with a hanger slot 60, for shipping to the veterinarian, display and resale to the consumer. The low cost associated with the device enables the kit 52 to be promoted and sold as a convenient low cost and/or disposable kit. Provision of the initially flat holder therefore reduces the packaging width requirements to the depth of the specimen cup, and enables stacking the packages in alternate facing relationship as shown in FIG. 13, with the positions of the cups offset from one another. Thus, two or more packaged kits can be shipped and stored in the space required for the depth of one specimen cup. Consequently, the initially flat but manually bendable configuration holder enables further reduction of the costs to the consumer for the specimen collection kit. Moreover, use of the specimen collection device 10 is self-evident, particularly when visual instructions in the form of a simple graphic is placed on the kit packaging as shown in FIG. 12.

A second alternate embodiment specimen collection device 10B is shown in FIG. 14. This device includes a holder 12B with a handle 32, an extension member 30, a cup holder 34B and associated flange 36B, a cup 14B and a lid 16 as generally described in connection with device 10. In this instance, however, the cup is provided with a locating pin 56, and the cup holder is provided with a slot 58 sized to slidably but with a close fit receive the locating pin. The complimentary pin and slot establish rotational orientation and automatic indexing of the cup in the cup holder, with provision of oppositely facing surfaces of at least one on each that are engagable upon relative rotation therebetween. These engagable surfaces and equivalent known or readily devised indexing structure insure the cup is repeatably positioned in a pre-selected orientation in the cup holder, and thereafter substantially prevents the cup from rotating in the cup holder. Indexing structure is particularly useful for collection devices that utilize the cup and lid connected together, to insure and maintain positioning of the lid laid back and resting on the back portion of the cup holder. Alternately, for example, two pins and holes may be provided to establish both indexing rotational orientation and limiting movement guide structure between the cup in the cup holder. As an example of an alternate complimentary cup and cup holder configured for simultaneous positioning and indexing purposes, a third alternate embodiment collection device 10C is shown in FIG. 15 with a rectangular cup 14C and lid 16C, the holder 12C being formed with a complimentary rectangular opening 38C by flange 36C and sized for a sliding but relatively close to snug fit with the cup. The specimen collection device in accordance with the invention may also be sized for collection of a solid specimen from an animal, and such collection will be understood to be encompassed in designation of collection of a urine specimen herein.

Figure 16:
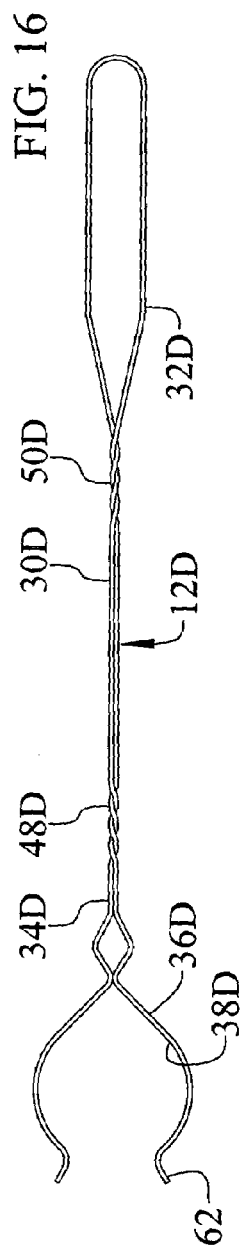
FIG. 16 is a top view of a fourth alternate embodiment holder provided with a handle centered on the longitudinal axis of the extension member, and a cup holder with an open end opposite the connection with the extension member.

In a fourth alternate embodiment shown in FIG. 16, the holder 12D includes a handle 32D that is centered on the longitudinal axis of the extension member 30D. The ends 48D, 50D of the extension member are formed with a wire-twisted configuration having bending stiffness characteristics for ease of shaping and bending the holder from the flat configuration shown to the user's preference for use in collecting a specimen. The holder 12D is further provided with a cup holder 34D that includes a flange structure 36D that substantially encircles the cup, but includes an open end 62 opposite the connection with the extension member. The open ring structure enables fabrication of the holder with increased manufacturing tolerances as compared with a closed-ring cup holder configuration, while still providing for a snug fit with the specimen cup. For example, the opening 38D may be formed at a size slightly smaller than the size of the specimen cup, such that inserting the cup into the holder expands the opening for a snug fit around the cup. The resilient characteristic of the open end snugly accepts cups of different sizes. The adjustability of the open end enables manual reshaping of the opening 38D to insure a snug fit around the specimen cup. The open-ring structure shown is provided with outwardly curved or tapering free ends. This enables alternate insertion of the cup into the holder through the open end of the holder. Thus, while the closed ring structure of the previously described cup holder, extending in a single plane, promotes enhanced rigidity, the open ring structure promotes ease of manufacturing. In keeping with the invention, this open-ring flange structure is sufficiently closed to establish forwardly facing, rearwardly facing and oppositely facing sides guide structure, to snugly receive and limit side-to-side and front-to-back movement of the cup in the opening 38D.

Figure 17:
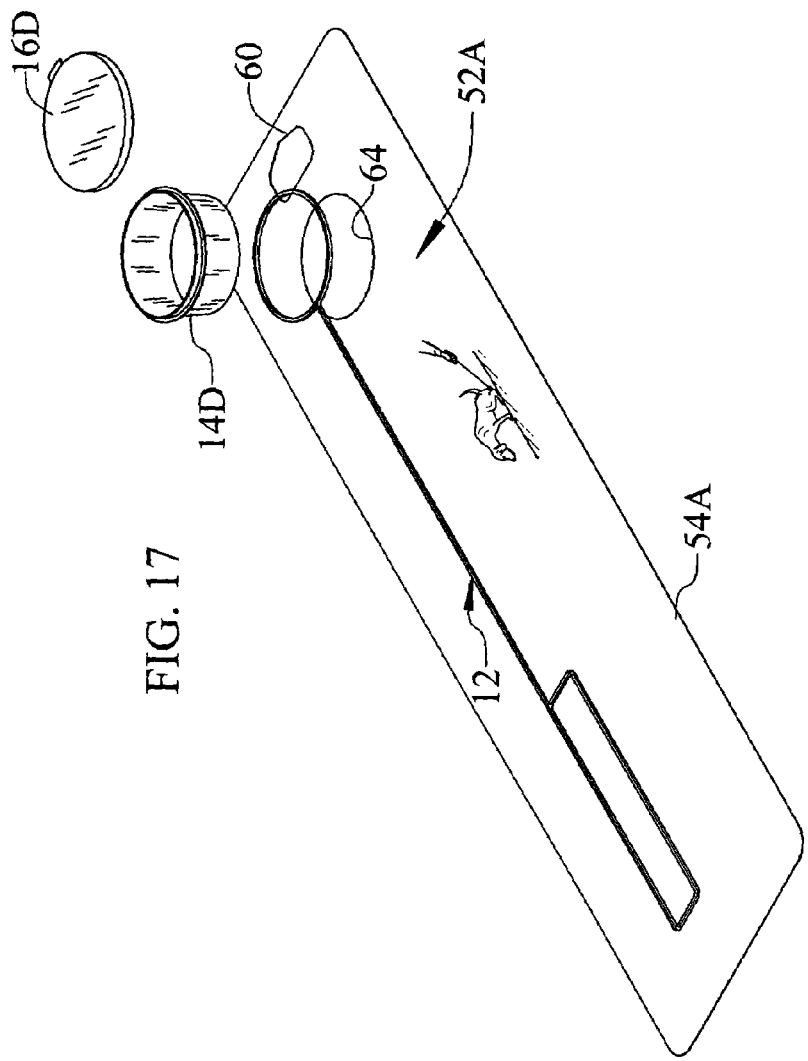
FIG. 17 is an exploded perspective view of an alternate urine specimen collection kit including a collection cup and lid not connected together.

Referring to FIG. 17, an exploded perspective view an alternate specimen collection kit 52A is shown comprising a backing card 54A, the holder 12 in a flat condition, a plastic cup 14D, and a cup lid 16D that is separate from the cup. When the kit is assembled together, the holder is secured against the card with the opening 38D aligned with a hole 64 formed through the card. The cup is positioned in its normal position in the holder, and extends through the aligned opening 64 in the card, and the lid is secured in position on the cup or to the backing card. Additional alternate configuration specimen collection devices that fall within the scope of the present invention will be readily devise by those skilled in the art.

From the foregoing, it will be apparent that the present invention brings to the art a unique animal specimen collection device that is more convenient and less intrusive to use than prior devices of the same general type. The specimen collection device is relatively simple in construction and use, can be manufactured and distributed at relatively low costs to the consumer, and is readily adaptable to the preference of the user. The specimen collection device of the present invention enables the user to stand near the back of the animal and to easily position the specimen cup under the animal. The specimen collection device, method and kit are suitable for personal or home use with domesticated animals such as the family dog or cat, with several types of farm animals, and for commercial use such as in zoos and kennels. The present invention brings many features and advantages not available in prior urine specimen collection devices.

I claim:

1. A device for collection of an animal urine specimen comprising:
   a) a plastic specimen cup with an open top to receive and hold a urine specimen;
   b) a plastic lid removably securable to the cup to close the top of the cup after collection of the specimen; and
   c) a holder having an operative position with i) a center extension member with upper and lower ends, the ends of the extension member being formed with a wire-twisted configuration, ii) a cup holder extending integrally forwardly from the lower end of the extension member, the cup holder and extension member being connected with semi-rigid yet manually bendable material comprising a wire structure to enable manual repositioning of the extension member and the cup holder in relation to one another to the user's convenience, the cup holder having a) a downwardly extending opening slidably receiving the cup in an upright position, and b) rearwardly facing, forwardly facing, and oppositely facing side structure positioned to prevent the cup from slipping out the front, back and sides of the opening, and iii) a handle extending integrally from the upper end of the extension member to enable manual positioning of the specimen cup in said upright position under the animal from which the specimen is to be collected.

2. The device as defined in claim 1 in which the cup holder further includes an upwardly facing surface structure, and the cup further includes a downwardly facing surface structure supported by the upwardly facing surface structure of the cup holder when the cup is positioned in the opening.

3. The device as defined in claim 2 in which the cup and cup holder include complimentary flange structures establishing said surface structures, and the flange structure of the cup holder extends at least substantially uninterrupted around said opening and establishes said rearwardly facing, forwardly facing, and oppositely facing side structure.

4. The device as defined in claim 1 in which the entire extension member is formed with semi-rigid yet manually continuously bendable material comprising a wire structure to enable manual reshaping of the holder to the user's convenience.

5. The device as defined in claim 4 in which the holder is formed with unitary wire construction.

6. The device as defined in claim 4 in which the holder is formed with unitary molded plastic construction.

7. A device for collection of an animal urine specimen comprising:

a) a plastic specimen cup with an open top to receive and hold a urine specimen and with a flange structure having downwardly facing surface structure;

b) a plastic lid removably securable to the cup to close the open top after collection of the specimen; and c) a holder having an operative position with i) a center extension member with upper and lower ends, ii) a cup holder extending forwardly from the lower end of the extension member, a) the cup holder having a downwardly extending opening slidably receiving the cup in an upright position and having a flange structure with an upwardly facing surface structure supporting the downwardly facing surface structure of the cup when the cup is positioned in said opening, the flange structure of the cup holder extending at least substantially uninterrupted around said opening and being sized to maintain the cup in a substantially fixed position in said opening, and iii) a handle extending from the upper end of the extension member to enable manual positioning of the specimen cup in said upright position under the animal from which the specimen is to be collected, d) the holder being formed with semi-rigid yet manually bendable material connecting at least the extension member and the cup holder to enable manual repositioning of the extension member and the cup holder in relation to one another to the user's convenience.

8. The device as defined in claim 7 in which the entire extension member is formed with semi-rigid yet manually bendable material to enable manual reshaping of the holder to the user's convenience.

9. The device as defined in claim 8 in which the holder is formed with material including a semi-rigid yet manually bendable wire-type structure.

10. The device as defined in claim 9 in which the holder is formed with unitary wire construction.

11. The device as defined in claim 7 in which the handle extends rearwardly from the upper end of the extension member with an inside angle less than 180 degrees.

12. The device as defined in claim 7 in which the holder is formed with unitary molded plastic construction.

13. The device as defined in claim 7 in which the holder is formed with a continuously reshapeable unitary wire construction and in which the ends of the extension member are formed with a wire-twisted configuration.

14. A device for collection of an animal urine specimen comprising:

a) a plastic specimen cup with an open top to receive and hold a urine specimen, and with an outwardly extending flange;

b) a plastic lid removably securable to the cup to close the open top after collection of the specimen; and c) a holder having an operative position with i) a center extension member with upper and lower ends, ii) a cup holder extending forwardly from the lower end of the extension member establishing an angle of between approximately 90 to 150 degrees therebetween, iii) the cup holder having an at least substantially closed flange structure a) establishing an opening slidably receiving the cup and maintaining the cup in a substantially fixed position therein, and b) supporting the flange of the specimen cup to maintain the cup in an upright position when the cup is positioned in the opening; and d) a handle extending from the upper end of the extension member to enable positioning of the specimen cup in said upright position under the animal from which the specimen is to be collected, the overall length of holder and handle being approximately 20 inches.

15. The device as defined in claim 14 in which the holder is formed with a continuously reshapeable unitary wire construction and in which the ends of the extension member are formed with a wire-twisted configuration.

16. A kit for collection of an animal urine specimen comprising:

a) a plastic specimen cup with an open top to receive and hold the urine specimen;

b) a plastic lid removably securable to the cup to close the top of the cup after collection of the specimen;

c) a substantially flat holder having i) a center extension member with first and second ends,
ii) a cup holder extending from the first end of the extension member, the cup holder having an opening sized to slidably receive the cup, and
iii) a handle extending from the second end of the extension member; and
d) a package locating the holder, the cup and the lid in confined relation to one another for shipping, storage and display purposes;
e) the holder being formed with semi-rigid yet manually bendable material connecting the extension member and the cup holder to enable manual repositioning of the extension member and cup holder in relation to one another when removed from the package to establish an operative position with:
i) the extension member in a generally upright to rearwardly extending position with said first and second ends establishing lower and upper ends, respectively,
ii) the cup holder extending forwardly from the lower end of the extension member at an inside angle of between approximately 90 to 150 degrees therebetween, and
iii) the opening in the cup holder in an downwardly extending position receiving and holding the cup in an upright position for manually positioning of the cup under the animal from which the urine specimen is to be collected.

17. The kit as defined in claim 16 in which the entire extension member is formed with semi-rigid yet manually bendable material to enable manual reshaping of the holder to the user's convenience when removed from the package.

18. A method for collection of an animal urine specimens comprising:
a) providing
i) a plastic specimen cup with an open top to receive and hold the urine specimen,
ii) a plastic lid removably securable to the cup to close the top of the cup after collection of the specimen, and
iii) a semi-rigid yet manually bendable holder comprising a wire structure and having an operative position with
a) a center extension member with upper and lower ends, the ends of the extension member being formed with a wire-twisted configuration,
b) a cup holder extending integrally forwardly from the lower end of the extension member and removably carrying the cup, and
c) a handle extending integrally from the upper end of the extension member;
b) with the holder, manually positioning the cup in an upright position opening upwardly under the animal;
c) collecting the urine specimen in the cup located under the animal while it urinates;
d) withdrawing the cup holder and cup from under the animal; and
e) closing the cup with the lid to contain the urine specimen therein.

19. The method as defined in claim 18 in which the method further comprises reshaping the holder for the user's convenience prior to the positioning the cup under the animal.

* * * * *